UNITED STATES PATENT OFFICE.

HEINRICH HEIMANN, OF DESSAU, GERMANY, ASSIGNOR TO ACTIEN GESELLSCHAFT FÜR ANILIN FABRIKATION, OF BERLIN, GERMANY.

SULFURIZED DYES AND PROCESS OF MAKING SAME.

1,098,259.     Specification of Letters Patent.     Patented May 26, 1914.

No Drawing.     Application filed October 16, 1912. Serial No. 726,122.

*To all whom it may concern:*

Be it known that I, HEINRICH HEIMANN, a citizen of the German Empire, residing at Dessau, Germany, my post-office address being Friedrich-Schneider strasse 63, Dessau, Germany, have invented new and useful Improvements in Sulfurized Dyes and Processes of Making Same, of which the following is a specification.

In my co-pending application Serial No. 726,121 I describe and claim generally new sulfurized dyes fast to washing and to hlorin which may be obtained by acting with a sulfurizing agent upon a 4-hydroxy-diarylamin in which only the 4-hydroxyaryl group is capable of assuming the paraquinoid form. Now in my present application I claim a special class of these dyestuffs which derive from such 4-hydroxy-diarylamins in which the 4'-position is occupied by an alkyl group or from their derivatives in which the two benzene nuclei contain further univalent substituents, such as a halogen, an alkyl or alkoxy group, a carboxylic group, etc., the sulfonic group, however, being excepted. In producing the new sulfur dyes according to this invention I can also use as parent material the corresponding thio compounds, *i. e.* the corresponding derivatives of thiodiphenylamin; thus for instance instead of 4-hydroxy-4'-methyldiphenylamin I can also employ the 4-oxy-4'-methylthiodiphenylamin.

The following examples may serve to illustrate my invention, the parts being by weight:

1. 60 parts of sulfur are dissolved in 180 parts by volume of a sodium sulfid solution containing 50% of $Na_2S.9H_2O$; into this solution are introduced 30 parts of 4-hydroxy-4'-methyldiphenylamin, whereupon the mass is heated to the boil in a reflux apparatus for 40–80 hours. The reaction being finished, the dyestuff is isolated in the usual manner; it may also be precipitated from a solution in sodium sulfid by the addition of common salt. A product is thus obtained which produces on cotton without a mordant from a bath containing an alkali sulfid red-brown tints with a yellow cast; they possess a very good fastness to washing and remarkable fastness to chlorin.

2. 100 parts of 4-hydroxy-4'-methyldiphenylamin and 100 parts of sulfur are heated during 2–4 hours to about 180 to 200° C., whereupon the mass is brought to a temperature of 200–220° C. and this temperature is maintained during 7–10 hours. The new dye thus obtained may be isolated in the usual manner; it dyes cotton red-brown tints of a very good fastness to washing and of a remarkable fastness to chlorin.

It is obvious to those skilled in the art that my present invention is not limited to the foregoing examples or to the details given therein. Thus for instance instead of the 4-hydroxy-4'-methyldiphenylamin a chloro derivative or an alkyl derivative thereof may be used; instead of a polysulfid or of sulfur alone sulfur in combination with a condensing agent may be employed.

The new dyes as obtained above represent in the dry state when pulverized, generally speaking, dark brown powders which are practically insoluble in alcohol, glacial acetic acid and benzene and which are very difficutly soluble in nitro-benzene, anilin, pyridin and chloro derivatives of benzene, these solutions being, generally speaking, yellow-brown to red-brown colored. They dissolve in concentrated sulfuric acid, generally speaking, to a blue solution and in 25% fuming sulfuric acid, generally speaking, to a violet solution, these solutions remain unaltered on the addition of boric acid, but are gradually decolorized by the addition of aluminium powder.

The new dyes produce on cotton from a dye-bath containing an alkali sulfid, generally speaking, red-brown or brown-red tints, which are very fast to washing and remarkably fast to chlorin; the new dyes are also capable of being dyed from a hydrosulfite vat giving, generally speaking, brown-red tints.

Having now described my invention and the manner in which it may be carried out, what I claim is,—

1. The manufacture of new sulfurized dyes fast to washing and to chlorin by acting with a sulfurizing agent upon a 4-hydroxy-4'-alkyldiphenylamin containing no sulfonic group and having the following nucleus:

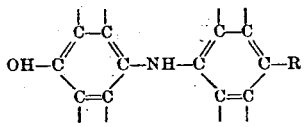

in which diagram R means an alkyl group.

2. The manufacture of new sulfurized dyes fast to washing and to chlorin by acting with a polysulfid upon a 4-hydroxy-4'-alkyldiphenylamin containing no sulfonic group and having the following nucleus:

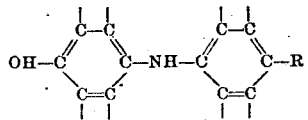

in which diagram R means an alkyl group.

3. The manufacture of new sulfurized dyes fast to washing and to chlorin by acting with a polysulfid in the presence of a substance being a liquid at the temperatures prevailing during the reaction upon a 4-hydroxy-4'-alkyldiphenylamin containing no sulfonic group and having the following nucleus:

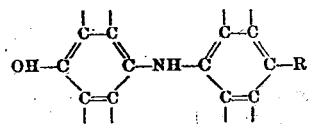

in which diagram R means an alkyl group.

4. The manufacture of new sulfurized dyes fast to washing and to chlorin by acting with a sulfurizing agent upon 4-hydroxy-4'-methyldiphenylamin.

5. The manufacture of a new sulfurized dye fast to washing and to chlorin by acting with a polysulfid upon 4-hydroxy-4'-methyldiphenylamin.

6. The manufacture of a new sulfurized dye fast to washing and to chlorin by acting with a polysulfid in the presence of a suitable liquid upon 4-hydroxy-4'-methyldiphenylamin.

7. As new articles of manufacture new sulfurized dyes, very fast to washing and remarkably fast to chlorin, derived from a 4-hydroxy-4'-alkyldiphenylamin, containing no sulfonic group and having the following nucleus:

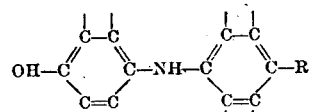

in which diagram R means an alkyl group, these new dyes representing in the dry state when pulverized dark brown powders which are practically insoluble in alcohol, glacial acetic acid and benzene and which are very difficultly soluble in nitrobenzene, anilin, pyridin and chloro derivatives of benzene, these solutions being, generally speaking, yellow-brown to red-brown colored, which new dyes dissolve in concentrated sulfuric acid, generally speaking, to a blue solution and in 25% fuming sulfuric acid, generally speaking, to a violet solution, which solutions on the addition of boric acid remain unaltered but are gradually decolorized by the addition of aluminium powder, and which new dyes produce on cotton from a dye-bath containing an alkali sulfid, generally speaking, red-brown to brown-red tints which are very fast to washing and remarkably fast to chlorin, and which new dyes are also capable of being dyed from a hydrosulfite vat giving, generally speaking, brown-red tints.

8. As new articles of manufacture new sulfurized dyes, very fast to washing and remarkably fast to chlorin, which may be obtained from a 4-hydroxy-4'-methyldiphenylamin by the action of a sulfurizing agent, these new dyes representing in the dry state when pulverized dark brown powders which are practically insoluble in alcohol, glacial acetic acid and benzene and which are very difficultly soluble in nitrobenzene, anilin, pyridin and chloro derivatives of benzene, these solutions, being, generally speaking, yellow-brown to red-brown colored, which new dyes dissolve in concentrated sulfuric acid, generally speaking, to a blue solution and in 25% fuming sulfuric acid, generally speaking, to a violet solution, which solutions on the addition of boric acid remain unaltered but are gradually decolorized by the addition of aluminium powder, and which new dyes produce on cotton from a dye-bath containing an alkali sulfid, generally speaking, red-brown to brown-red tints which are very fast to washing and remarkably fast to chlorin, and which new dyes are also capable of being dyed from a hydrosulfite vat giving, generally speaking, brown-red tints.

9. As a new article of manufacture the new sulfurized dye, which may be obtained from 4-hydroxy-4'-methyldiphenylamin by the action of an alkali polysulfid, this new dye representing in the dry state when pulverized a dark red-brown powder which is practically insoluble in alcohol, glacial acetic acid and benzene and which is very difficultly soluble in nitrobenzene, anilin, pyridin and chloro derivatives of benzene to a red-brown solution, and which new dye dissolves in concentrated sulfuric acid to a blue solution and in 25% fuming sulfuric acid to a violet solution which solutions on the addition of boric acid remain unaltered but are gradually decolorized by the addition of aluminium powder, and this new dye producing on unmordanted cotton from a dye-bath containing an alkali sulfid a brown-red tint with a yellow cast which is very fast to washing and remarkably fast to chlorin, and which new dye is also capable of dyeing unmordanted cotton from a hydrosulfite vat forming a yellow vat, which gives a brown-red tint with a yellow cast.

In testimony whereof I have signed my name to this specification in the presence of two subscribing witnesses.

HEINRICH HEIMANN.

Witnesses:
RUDOLPH FRICKE,
DORIS KRAHL.